(12) United States Patent  
Kawamoto

(10) Patent No.: US 8,443,776 B2
(45) Date of Patent: May 21, 2013

(54) SEAL STRUCTURE, CHAIN CASE, AND SEAL STRUCTURE FORMATION METHOD

(75) Inventor: Naoya Kawamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 704 days.

(21) Appl. No.: 12/429,548

(22) Filed: Apr. 24, 2009

(65) Prior Publication Data

US 2009/0266332 A1 Oct. 29, 2009

(30) Foreign Application Priority Data

Apr. 24, 2008 (JP) .................................. 2008-113889

(51) Int. Cl.
*F02B 75/22* (2006.01)

(52) U.S. Cl.
USPC ..................... 123/195 C; 123/90.37; 277/591

(58) Field of Classification Search
USPC ................ 123/73 PP, 195 C, 73 R, 305, 573, 123/306, 41.82 R, 90.37; 277/592, 944, 922, 277/312–314, 645, 591; 418/83
See application file for complete search history.

(56) References Cited

U.S. PATENT DOCUMENTS

| 5,419,686 | A | * | 5/1995 | Wissmann et al. | ........... | 417/380 |
| 5,727,791 | A | * | 3/1998 | Weiss et al. | .................. | 277/592 |
| 6,659,471 | B2 | | 12/2003 | Mori et al. | | |
| 7,038,494 | B2 | | 5/2006 | Morton | | |

FOREIGN PATENT DOCUMENTS

| JP | 09280484 A | * 10/1997 |
| JP | 10274098 A | 10/1998 |
| JP | 11336907 A | 12/1999 |
| JP | 2000145972 A | 5/2000 |
| JP | 2002257241 | 9/2002 |
| JP | 2002349344 A | 12/2002 |
| JP | 2003049712 A | 2/2003 |
| JP | 2004068672 | 3/2004 |

* cited by examiner

*Primary Examiner* — Noah Kamen
(74) *Attorney, Agent, or Firm* — Gifford, Krass, Sprinkle, Anderson & Citkowski, P.C.

(57) ABSTRACT

A chain case disposed opposite an interval between a cylinder block and a cylinder head sandwiching a gasket includes a liquid sealing material guiding recessed portion that opposes the interval and is entirely surrounded by a seal surface. During seal structure formation, a large amount of a liquid sealing material is caused to flow forcefully toward the interior of the interval when an operation is performed to fasten the chain case to the cylinder block and the cylinder head such that the liquid sealing material flows to the innermost portion of the interval, and as a result, the liquid sealing material can reach an end portion of the gasket reliably. Hence, the liquid sealing material can flow sufficiently to positions requiring sealing, whereby lubricating oil leakage from the interior of the chain case can be prevented.

15 Claims, 13 Drawing Sheets

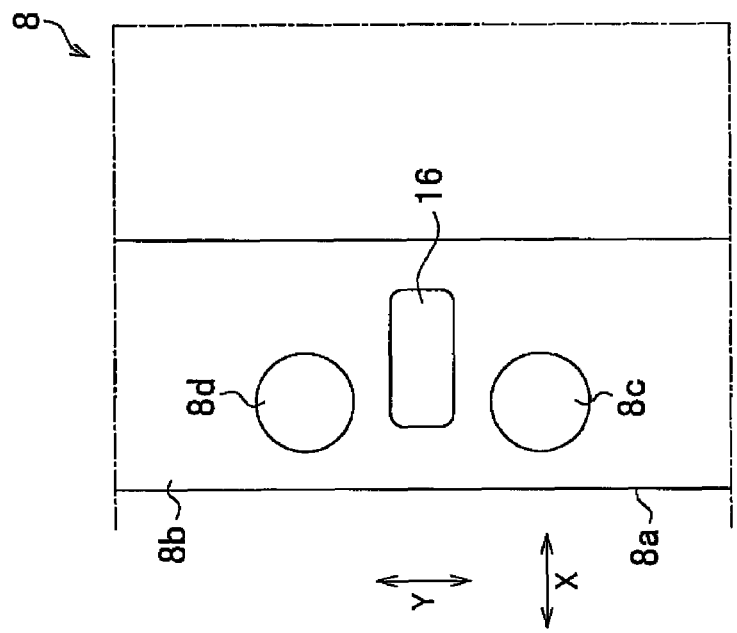
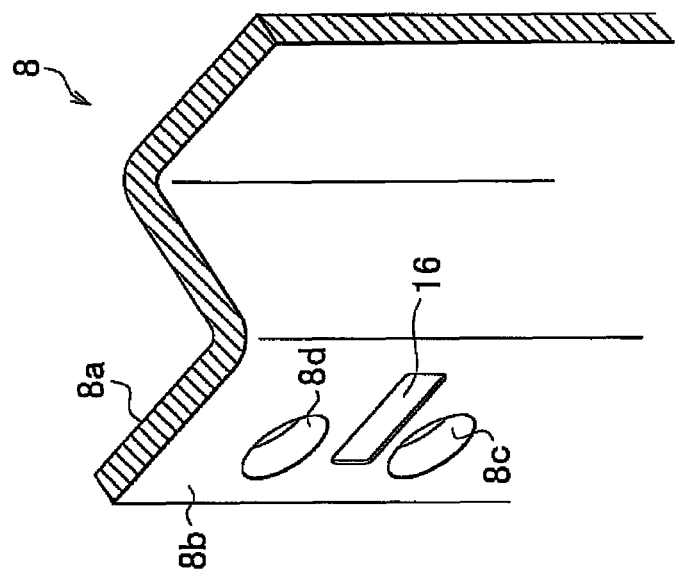

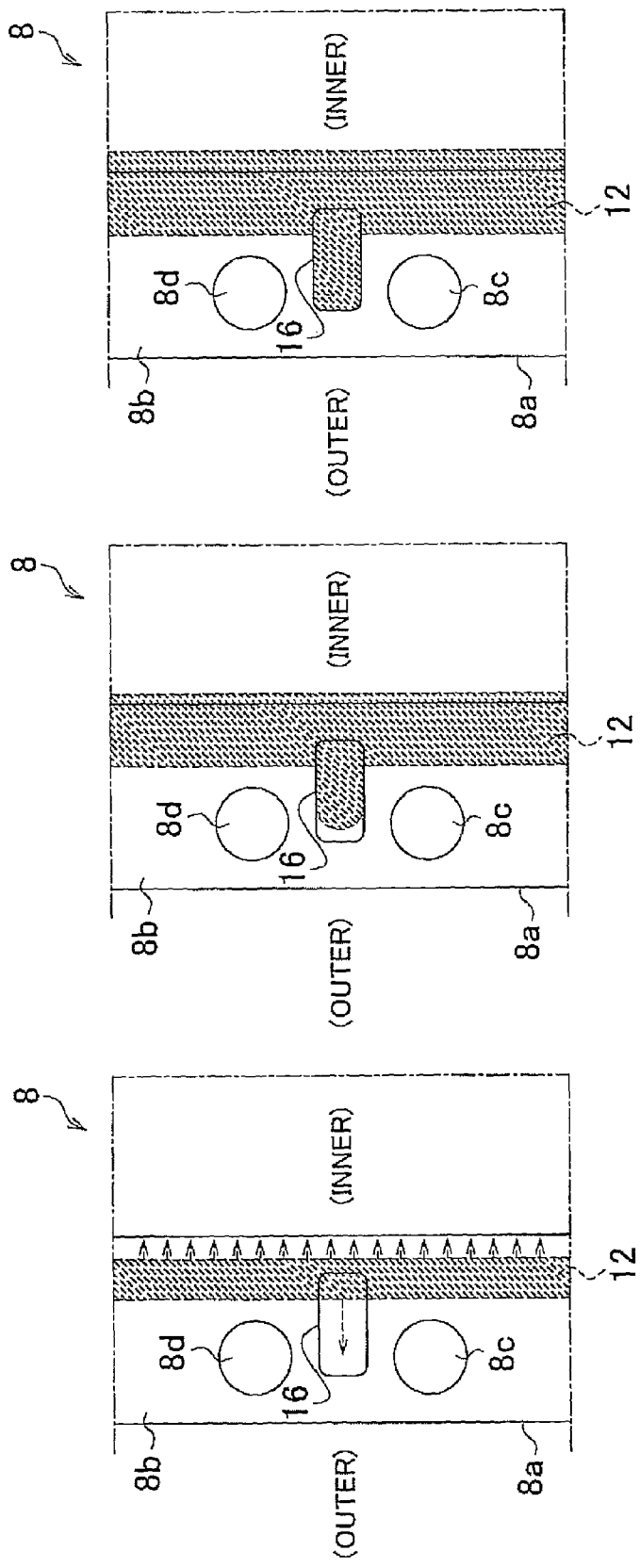

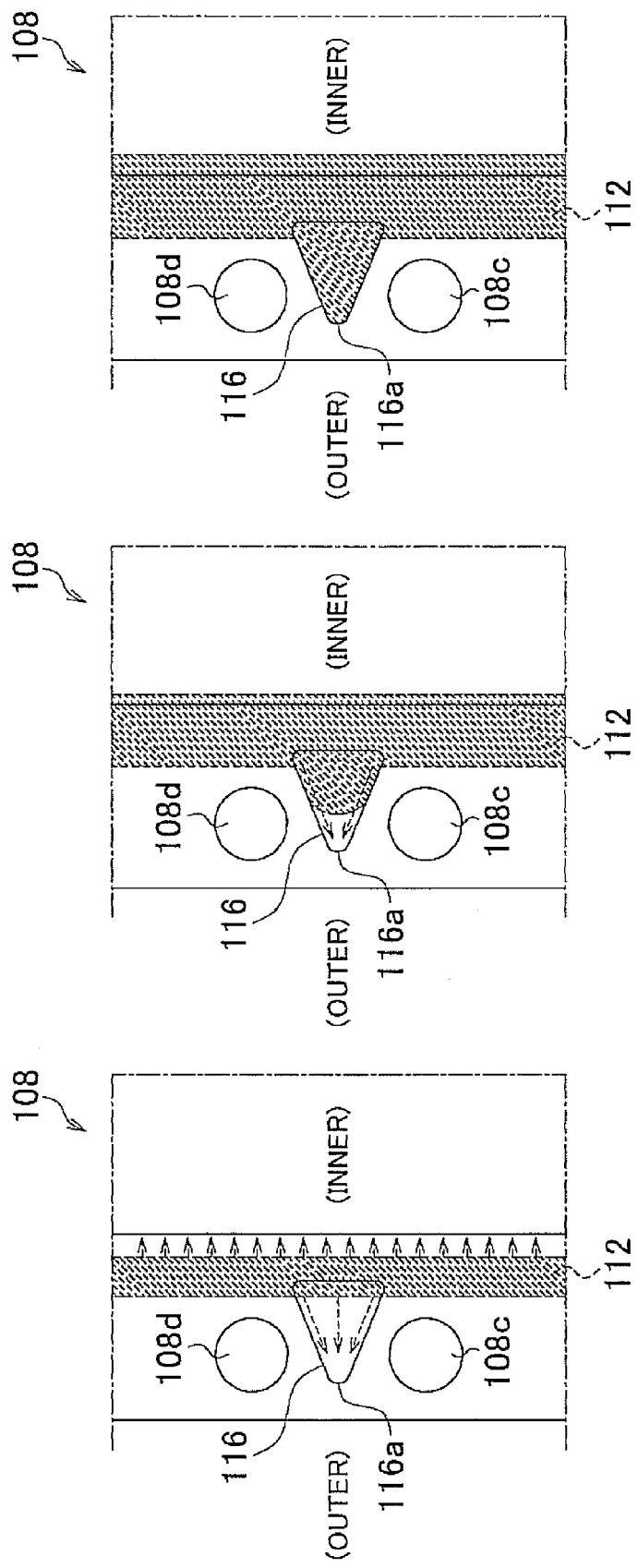

SEAL STRUCTURE, CHAIN CASE, AND SEAL STRUCTURE FORMATION METHOD

INCORPORATION BY REFERENCE

The disclosure of Japanese Patent Application No. 2008-113889 filed on Apr. 24, 2008 including the specification, drawings and abstract is incorporated herein by reference in its entirety.

BACKGROUND OF THE INVENTION

1. Field of the Invention

The invention relates to a seal structure for a part which includes an interval between a first member and a second member sandwiching a gasket, and in which a third member is disposed to face the first member and second member via a liquid sealing material, a chain case on which this seal structure can be used, and a seal structure formation method.

2. Description of the Related Art

A seal structure including an interval between two mated members, in which a third member is disposed via a liquid sealing material, or in other words a seal structure for a so-called three surface mating portion, is used as a seal structure for a chain case (also referred to as a chain cover) of an internal combustion engine (see Japanese Patent Application Publication No. 2004-68672 (JP-A-2004-68672) and Japanese Patent Application Publication No. 2002-257241 (JP-A-2002-257241), for example). The chain case is bolted to the internal combustion engine side and sealed to an internal combustion engine side wall surface via the liquid sealing material (also referred to as liquid packing or a liquid gasket).

However, in this type of seal structure, the liquid sealing material must extend to the internal combustion engine side, or in this case to an end portion of a gasket sandwiched between a cylinder head and a cylinder block. When the liquid sealing material does not extend to and seal the end portion of the gasket, lubricating oil in the chain case passes between the cylinder head and the cylinder block through a gap between the gasket end portion and the liquid sealing material and leaks to the outside.

In JP-A-2004-68672, to prevent lubricating oil leakage from the interior of the chain case, an angle formed by the cylinder head and the cylinder block is chamfered to form a space into which the liquid sealing material is charged, and the end portion of the gasket is disposed in this space to ensure that a gap is not formed between the gasket and the liquid sealing material. Furthermore, a groove is formed on the chain case side so that even when the end portion of the gasket projects to the chain case side, a seal can be formed by the liquid sealing material.

In JP-A-2002-257241, a recessed portion is formed on the chain case side around the interval between the cylinder head and the cylinder block such that pressure is applied to the liquid sealing material entering the interior of the recessed portion during fastening of the chain case, and as a result, the liquid sealing material is pushed into a space formed by chamfering in a similar manner to JP-A-2004-68672. Thus, a gap is not formed between the gasket end portion and the liquid sealing material.

However, in both JP-A-2004-68672 and JP-A-2002-257241, when the chain case is fastened to the internal combustion engine side such that the liquid sealing material receives pressure between the chain case and the internal combustion engine, the liquid sealing material flows in an opening direction of the groove-form space or the groove-form recessed portion, or in other words a horizontal left-right direction (a width direction of the gasket disposal interval). Hence, the liquid sealing material does not infiltrate the interval between the cylinder head and the cylinder block sufficiently, and as a result, the liquid sealing material does not flow sufficiently to the position in which sealing is required.

SUMMARY OF THE INVENTION

The invention provides a seal structure with which a liquid sealing material can be caused to flow sufficiently to a position requiring sealing during attachment of a third member such as a chain case, a chain case, and a seal structure formation method.

A seal structure according to a first aspect of the invention is a seal structure for a part which includes an interval between a first member and a second member sandwiching a gasket, and in which a third member is disposed to face the first member and the second member via a liquid sealing material, wherein a seal surface of the third member includes a liquid sealing material guiding recessed portion that opposes the interval and is entirely surrounded by the seal surface, and an internal region of the liquid sealing material guiding recessed portion includes a part of a region to which the liquid sealing material is applied.

The third member disposed to face the first member and second member sandwiching the gasket includes the liquid sealing material guiding recessed portion opposing the interval. The liquid sealing material guiding recessed portion is entirely surrounded by the seal surface, and therefore, when the third member is disposed to face the first member and second member to form the seal structure, the liquid sealing material flows therein from the periphery. The inflowing liquid sealing material fills the liquid sealing material guiding recessed portion together with liquid sealing material that flows directly into the liquid sealing material guiding recessed portion or liquid sealing material already existing in the liquid sealing material guiding recessed portion. Further, as clamping of the third member to the first member and second member progresses, the periphery of the liquid sealing material guiding recessed portion eventually arrives at a state of surface contact, and as a result, the liquid sealing material in the interior of the liquid sealing material guiding recessed portion runs out of places to escape to and therefore increases in pressure.

As a result, a large amount of the liquid sealing material is caused to flow forcefully toward the narrow interval sandwiching the gasket, and therefore, the liquid sealing material can flow into the innermost portion of the interval so as to reach an end portion of the gasket reliably.

The space and the recessed portion disclosed in JP-A-2004-68672 and JP-A-2002-257241 are formed in a groove shape in the width direction of the interval, and therefore the liquid sealing material has enough places to escape to until the periphery of the space or the recessed portion enters a state of surface contact. Hence, the pressure of the liquid sealing material cannot be increased sufficiently. As a result, it is difficult for the liquid sealing material to flow to the innermost portion of the interval.

Thus, in the first aspect of the invention, a seal structure with which the liquid sealing material can be caused to flow sufficiently to positions requiring sealing during attachment of the third member can be provided. Furthermore, in the first aspect of the invention, the internal region of the liquid sealing material guiding recessed portion may include a part or all of a region in which the liquid sealing material is applied to the interval.

Hence, the internal region of the liquid sealing material guiding recessed portion in particular may include a part or all of the region in which the liquid sealing material is applied to the interval. Thus, a seal structure in which a large amount of the liquid sealing material can be caused to flow to the innermost portion of the interval effectively so as to reach the end portion of the gasket reliably can be provided.

A seal structure according to a second aspect of the invention is a seal structure which includes an interval between a first member and a second member sandwiching a gasket, and in which a third member is disposed to face the first member and the second member via a liquid sealing material, wherein a seal surface on one or both of the first member and the second member includes a liquid sealing material guiding recessed portion that is entirely surrounded by the interval and the seal surface, and an internal region of the liquid sealing material guiding recessed portion includes a part of a region to which the liquid sealing material is applied.

Hence, the liquid sealing material guiding recessed portion may be formed in one or both of the first member and the second member. The liquid sealing material guiding recessed portion is entirely surrounded by the interval between the first member and second member and the seal surface, and therefore, when the third member is disposed to face the first member and second member to form the seal structure, the liquid sealing material flows therein from the periphery. The inflowing liquid sealing material fills the liquid sealing material guiding recessed portion together with liquid sealing material that flows directly into the liquid sealing material guiding recessed portion or liquid sealing material already existing in the liquid sealing material guiding recessed portion. Further, as clamping of the third member to the first member and second member progresses, the periphery of the liquid sealing material guiding recessed portion eventually arrives at a state of surface contact, and as a result, the liquid sealing material in the interior of the liquid sealing material guiding recessed portion runs out of places to escape to and increases in pressure.

As a result, a large amount of the liquid sealing material is caused to flow forcefully toward the narrow interval sandwiching the gasket, and therefore, the liquid sealing material can flow into the innermost portion of the interval so as to reach the end portion of the gasket reliably.

The space and the recessed portion disclosed in JP-A-2004-68672 and JP-A-2002-257241 are formed in a groove shape in the width direction of the interval, and therefore the liquid sealing material has enough places to escape to until the periphery of the space or the recessed portion enters a state of surface contact. Hence, the pressure of the liquid sealing material cannot be increased sufficiently. As a result, it is difficult for the liquid sealing material to flow to the innermost portion of the interval.

Thus, in the second aspect of the invention, a seal structure with which the liquid sealing material can be caused to flow sufficiently to positions requiring sealing during attachment of the third member can be provided. Furthermore, in the first and second aspects of the invention, the gasket may include a bead portion, one end of which exists on the seal surface side, and the internal region of the liquid sealing material guiding recessed portion may include a position of the bead portion and adjacent regions on both sides of the position of the bead portion in a width direction of the interval.

When the gasket includes the bead portion, the seal may be insufficient if the liquid sealing material only comes into contact with the end portion of the gasket. Therefore, by forming the liquid sealing material guiding recessed portion such that the internal region includes the position of the bead portion and the adjacent regions on both sides thereof in the width direction of the interval, the liquid sealing material can reliably contact the end portion of the bead portion and both sides thereof. As a result, a complete seal can be obtained.

Further, the liquid sealing material guiding recessed portion may be formed such that in the width direction of the interval, the internal region of the liquid sealing material guiding recessed portion is narrower in a thickness direction of the interval on the bead portion side than a side coated with the liquid sealing material.

By setting the size of the internal region in the thickness direction of the interval in this manner, when the third member approaches the first member and second member during formation of the seal structure, the liquid sealing material flows into the liquid sealing material guiding recessed portion from the periphery of the liquid sealing material guiding recessed portion on the large side of the internal region in the thickness direction of the interval. When the distance between the third member and the first member and second member is reduced further, the liquid sealing material in the liquid sealing material guiding recessed portion moves to become concentrated on the narrow bead portion side of the liquid sealing material guiding recessed portion in the thickness direction of the interval.

Thus, the liquid sealing material travels over the bead portion side of the internal region, and in this state, as described above in the first aspect of the invention, the periphery of the liquid sealing material guiding recessed portion eventually arrives at a state of surface contact such that the liquid sealing material in the liquid sealing material guiding recessed portion runs out of places to escape to and increases in pressure. As a result, a large amount of the liquid sealing material is caused to flow forcefully into the interval sandwiching the gasket, whereby the liquid sealing material flows into the innermost portion of the interval. Thus, the liquid sealing material reliably reaches the end portion of the gasket, and particularly the periphery of the bead portion.

Hence, a seal structure with which the liquid sealing material can flow sufficiently to the positions requiring sealing, i.e. the periphery of the bead portion for securing the seal, during attachment of the third member can be provided.

Further, in the seal structure according to the first and second aspects of the invention, the liquid sealing material guiding recessed portion may be formed to be deeper on the bead portion side than the side coated with the liquid sealing material in the width direction of the interval.

Hence, when the distance between the third member and the first member and second member decreases, the liquid sealing material in the liquid sealing material guiding recessed portion can flow reliably to the bead portion side. Alternatively, the liquid sealing material guiding recessed portion may be formed to be shallower on the bead portion side than the side coated with the liquid sealing material in the width direction of the interval.

Hence, when the distance between the third member and the first member and second member decreases, the liquid sealing material in the liquid sealing material guiding recessed portion can flow to the bead portion side, and the pressure of the liquid sealing material can be increased rapidly such that the liquid sealing material flows sufficiently to the innermost portion of the interval so as to reach the end portion of the gasket reliably.

In the first aspect and second aspect of the invention, the first member may be a cylinder head of an internal combustion engine, the second member may be a cylinder block of the internal combustion engine, and the third member may be a chain case of the internal combustion engine.

By forming the liquid sealing material guiding recessed portion in these members of an internal combustion engine, a seal structure with which the liquid sealing material can be caused to flow sufficiently to the gasket sandwiched in the interval between the cylinder head and the cylinder block, in which sealing is required, during fastening of the chain case can be provided, and as a result, lubricating oil leakage from the interior of the chain case can be prevented reliably.

Further, the seal surface of the third member may be attached to respective seal surfaces of the first member and the second member, and end faces of the first member and the second member that are orthogonal to surfaces thereof sandwiching the gasket may serve as the seal surfaces.

A structure constituted by this type of three-party surface relationship may be cited as the seal structure, and with this constitution, a seal structure with which the liquid sealing material can flow sufficiently to positions requiring sealing during attachment of the third member can be provided.

A chain case according to a third aspect of the invention is a chain case that is attached to a cylinder head and a cylinder block of an internal combustion engine, between which a gasket is sandwiched, including an interval between the cylinder block and the cylinder head, by disposing a flange portion relative thereto via a liquid sealing material, wherein a seal surface of the flange portion includes a liquid sealing material guiding recessed portion that opposes the interval in which the gasket is sandwiched and is entirely surrounded by the seal surface, and an internal region of the liquid sealing material guiding recessed portion includes a part of a region to which the liquid sealing material is applied.

In the internal combustion engine to which the chain case is attached, as described in the first aspect of the invention, the liquid sealing material that flows in from the periphery runs out of places to escape to and increases in pressure together with liquid sealing material that flows directly into the liquid sealing material guiding recessed portion or liquid sealing material that already exists in the liquid sealing material guiding recessed portion when the periphery of the liquid sealing material guiding recessed portion eventually arrives at a state of surface contact, and as a result, a large amount of the liquid sealing material is caused to flow forcefully into the interval sandwiching the gasket. Therefore, the liquid sealing material can flow into the innermost portion of the interval so as to reach an end portion of the gasket reliably.

Hence, by employing the chain case according to the third aspect of the invention, a seal structure with which the liquid sealing material can flow sufficiently to the positions requiring sealing during fastening of the chain case can be realized, and as a result, lubricating oil leakage from the interior of the chain case can be prevented.

Further, in the third aspect of the invention, the internal region of the liquid sealing material guiding recessed portion may include a part or all of a region in which the liquid sealing material is applied relative to the interval.

Hence, the internal region of the liquid sealing material guiding recessed portion in particular may include a part or all of the region in which the liquid sealing material is applied relative to the interval. As a result, a chain case in which a large amount of the liquid sealing material can be caused to flow to the innermost portion of the interval effectively so as to reach the end portion of the gasket reliably can be provided.

Further, the liquid sealing material guiding recessed portion may be formed such that in a width direction of the interval, the internal region of the liquid sealing material guiding recessed portion is narrower in a thickness direction of the interval on an outer side of the chain case than an inner side of the chain case.

When the size of the internal region of the liquid sealing material guiding recessed portion in the thickness direction of the interval is set in this manner, the liquid sealing material is offset to the chain case inner side, and therefore, when the chain case approaches the cylinder head and the cylinder block during formation of the seal structure, the liquid sealing material is initially taken into the liquid sealing material guiding recessed portion in the thickness direction of the interval so as to flow therein from the periphery. When the distance between the chain case and the cylinder head and cylinder block is reduced further, the liquid sealing material in the liquid sealing material guiding recessed portion moves to become concentrated on the chain case outer side, in which the size of the internal region of the liquid sealing material guiding recessed portion in the thickness direction of the interval is reduced.

Thus, the liquid sealing material travels over the interval in a wide range in the width direction, and from this state, as described above in the first aspect of the invention, the periphery of the liquid sealing material guiding recessed portion eventually arrives at a state of surface contact such that the liquid sealing material in the liquid sealing material guiding recessed portion runs out of places to escape to and increases in pressure. As a result, a large amount of the liquid sealing material is caused to flow forcefully and in a wide range into the interval sandwiching the gasket, and therefore, the liquid sealing material flows in a wide range to the innermost portion of the interval. Thus, the liquid sealing material can reach the end portion of the gasket reliably and in a wide range.

Hence, a seal structure with which the liquid sealing material can flow sufficiently and in a wide range to the positions requiring sealing during fastening of the chain case can be realized, and as a result, lubricating oil leakage from the interior of the chain case can be reliably prevented.

Further, the liquid sealing material guiding recessed portion may be formed to be deeper on the outer side of the chain case than the inner side of the chain case in the width direction of the interval.

In so doing, the liquid sealing material moves to the outer side when the distance between the chain case and the cylinder head and cylinder block decreases, and thus the liquid sealing material in the liquid sealing material guiding recessed portion can flow sufficiently and in a wide range to the positions requiring sealing.

Alternatively, the liquid sealing material guiding recessed portion may be formed to be shallower on the outer side of the chain case than the inner side of the chain case in the width direction of the interval.

In so doing, the liquid sealing material moves to the outer side and increases rapidly in pressure when the distance between the chain case and the cylinder head and cylinder block decreases. Thus, the liquid sealing material can flow sufficiently to the innermost portion of the interval so as to reach the end portion of the gasket reliably.

A seal structure formation method according to a fourth aspect of the invention is a method of forming a seal structure for a constitution in which a gasket is sandwiched between a first member and a second member by mating a third member coated with a liquid sealing material to the first member and the second member, the method including: applying the liquid sealing material to the third member, in which a liquid sealing material guiding recessed portion entirely surrounded by a seal surface is provided in the seal surface, with the liquid sealing material guiding recessed portion being included in an application path; then fastening the third member to the first member and the second member and mating the third member to the first member and the second member such that the liquid sealing material guiding recessed portion is disposed on an interval between the first member and the second member in which the gasket is sandwiched.

By fastening the third member to the first member and second member in this manner, the periphery of the liquid sealing material guiding recessed portion eventually enters a state of surface contact such that liquid sealing material applied directly to the liquid sealing material guiding recessed portion and the liquid sealing material that flows into the liquid sealing material guiding recessed portion run out of places to escape to and increase in pressure, as described above in the first aspect of the invention. As a result, a large amount of the liquid sealing material is caused to flow forcefully into the interval sandwiching the gasket, and therefore, the liquid sealing material can flow into the innermost portion of the interval so as to reach the end portion of the gasket reliably.

Hence, a seal structure with which the liquid sealing material can flow sufficiently to positions requiring sealing during fastening of the third member such that a reliable seal is achieved can be realized. Further, the liquid sealing material guiding recessed portion may be formed such that in a width direction of the interval between the first member and the second member, the internal region of the liquid sealing material guiding recessed portion is narrower in a thickness direction of the interval on an outer side of the third member than an inner side of the third member, and the application path of the liquid sealing material relative to the third member may pass a wide side of the internal region of the liquid sealing material guiding recessed portion in a thickness direction of the interval.

By causing the application path of the liquid sealing material to pass the wide side of the internal region of the liquid sealing material guiding recessed portion in the thickness direction of the interval in this manner, a large amount of the liquid sealing material can be applied to the liquid sealing material guiding recessed portion and caused to travel in a wide range in the width direction of the interval sandwiching the gasket together with the liquid sealing material that flows in during attachment of the third member. Furthermore, a large amount of the liquid sealing material can be caused to flow forcefully into the interval, and therefore the liquid sealing material can flow to the innermost portion of the interval in a wide range so as to reach the end portion of the gasket reliably.

Further, the liquid sealing material guiding recessed portion may be formed to be deeper on the outer side of the third member than the inner side of the third member in the width direction of the interval between the first member and the second member, and the application path of the liquid sealing material relative to the third member may pass a shallow side of the liquid sealing material guiding recessed portion.

By causing the application path of the liquid sealing material to pass the shallow side of the liquid sealing material guiding recessed portion in this manner, the directly applied liquid sealing material and the inflowing liquid sealing material can be caused to travel in a wide range in the width direction of the interval sandwiching the gasket during attachment of the third member. Furthermore, a large amount of the liquid sealing material can be caused to flow forcefully into the interval, and therefore the liquid sealing material can flow to the innermost portion of the interval in a wide range so as to reach the end portion of the gasket reliably.

Alternatively, the liquid sealing material guiding recessed portion may be formed to be shallower on the outer side of the third member than the inner side of the third member in the width direction of the interval between the first member and the second member, and the application path of the liquid sealing material relative to the third member may pass a deep side of the liquid sealing material guiding recessed portion.

By causing the application path of the liquid sealing material to pass the deep side of the liquid sealing material guiding recessed portion in this manner, the directly applied liquid sealing material and the inflowing liquid sealing material can be caused to travel to the outer side during attachment of the third member, and the pressure of the liquid sealing material can be increased rapidly such that a large amount of the liquid sealing material can be caused to flow forcefully into the interval. Hence, the liquid sealing material can flow sufficiently and in a wide range to the innermost portion of the interval so as to reach the end portion of the gasket reliably.

Further, a larger amount of the liquid sealing material may be applied to the liquid sealing material guiding recessed portion than other regions.

By applying a larger amount of the liquid sealing material to the internal region of the liquid sealing material guiding recessed portion in the third member than to other regions, the pressure in the liquid sealing material guiding recessed portion can be raised quickly and reliably when the third member is mated to the first member and second member, and an even larger amount of the liquid sealing material can be caused to flow even more forcefully into the interval from the liquid sealing material guiding recessed portion. Hence, a large amount of the liquid sealing material can flow to the innermost portion of the interval so as to reach the end portion of the gasket reliably.

Further, the first member may be a cylinder head of an internal combustion engine, the second member may be a cylinder block of the internal combustion engine, and the third member may be a chain case of the internal combustion engine.

By employing a chain case formed with the liquid sealing material guiding recessed portion described above during formation of a seal structure for an internal combustion engine, a seal structure with which the liquid sealing material can be caused to flow sufficiently to the gasket sandwiched between the cylinder head and cylinder block requiring sealing such that a reliably seal is achieved can be formed. As a result, lubricating oil leakage from the interior of the chain case can be reliably prevented.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIGS. 6A and 6B are constitutional diagrams illustrating a seal surface of the chain case according to the first embodiment;

FIGS. 7A to 7C are illustrative views showing the flow of a liquid sealing material according to the first embodiment;

FIGS. 10A to 10C are illustrative views showing the flow of a liquid sealing material according to the second embodiment;

DETAILED DESCRIPTION OF EMBODIMENTS

First Embodiment

Figure 1B:
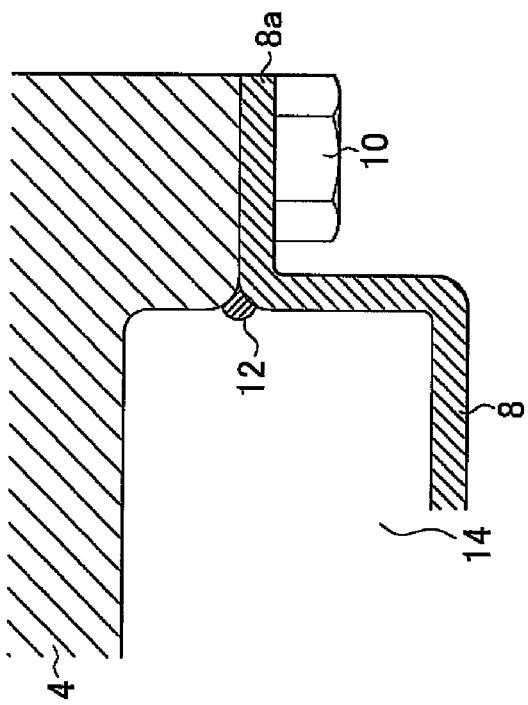
FIGS. 1A and 1B are constitutional diagrams showing the main parts of a seal structure according to a first embodiment.
Figure 1A:
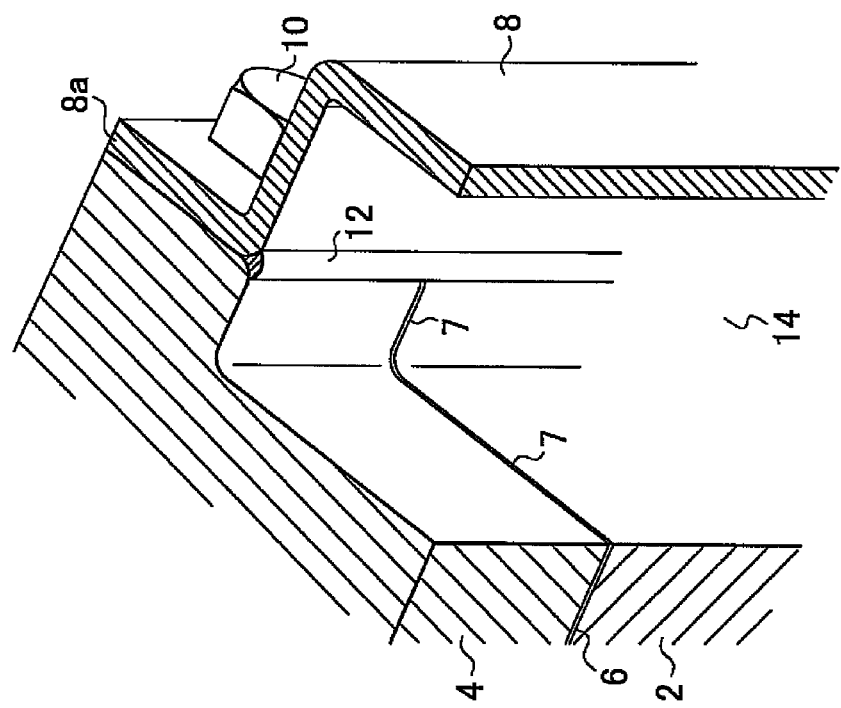

FIGS. 1A and 1B are constitutional diagrams showing the main parts of a seal structure for an internal combustion engine to which a seal structure according to a first embodiment of the invention is applied. FIG. 1A is a cut-off perspective view, and FIG. 1B is a plan view of the cut-off state shown in FIG. 1A. A cylinder head 4 is bolted to a cylinder block 2 via a gasket 6. A chain case 8 is fastened to an end face of the cylinder block 2 and an end face of the cylinder head 4 in the fastened state so as to cover an interval 7 in which the gasket 6 is sandwiched.

The chain case 8 is fastened to the cylinder block 2 and cylinder head 4 side by bolts 10 inserted into a flange portion 8a thereof. A liquid sealing material 12 is applied between the flange portion 8a of the chain case 8 and the respective end faces of the cylinder block 2 and cylinder head 4, including the interval 7, prior to fastening. During fastening by the bolts 10, the liquid sealing material 12 receives pressure so as to flow between the flange portion 8a and the cylinder block 2 and cylinder head 4, whereby a part thereof is extruded into an internal space 14 surrounded by the chain case 8. In this extruded state, the liquid sealing material 12 remains flexible but is hard enough to hold a shape. The liquid sealing material 12 is typically referred to as liquid packing, a liquid gasket, a formed-in-place-gasket (FIPG), and so on.

Figure 2:
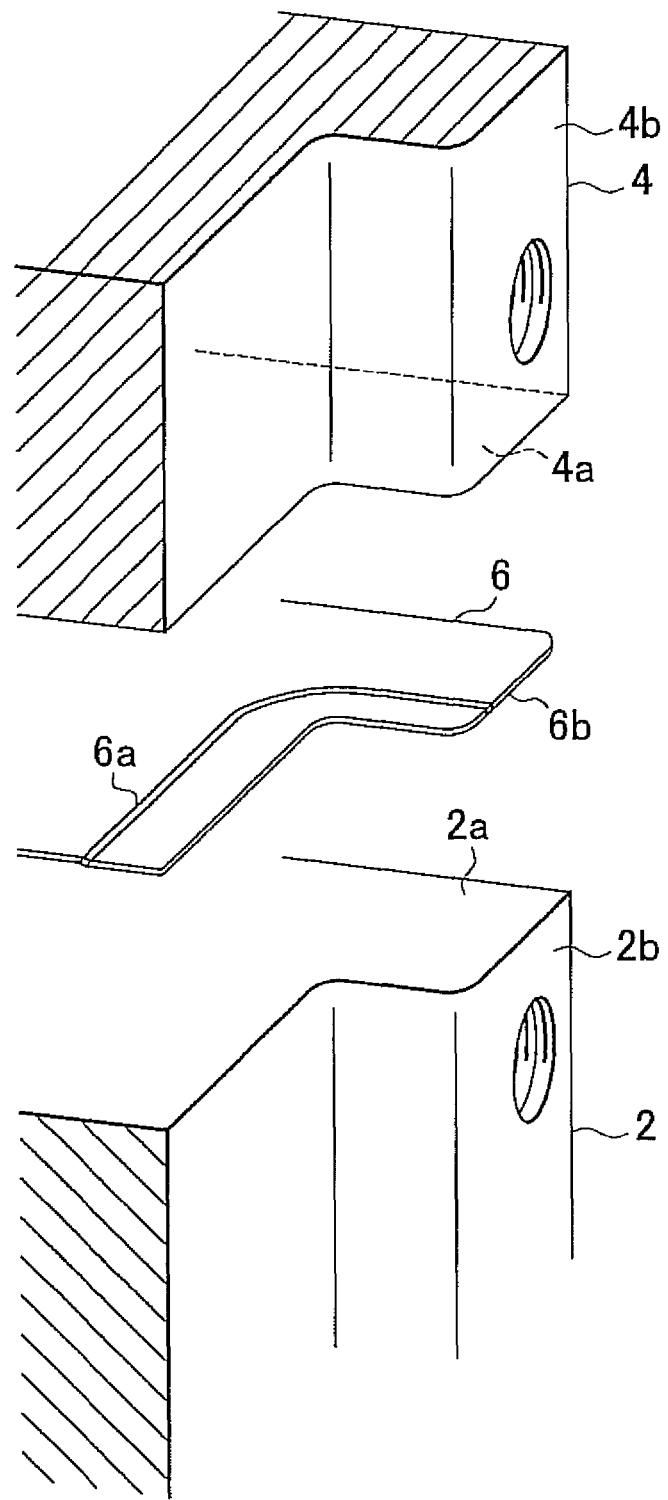
FIG. 2 is an exploded perspective view showing a state immediately before a cylinder head is bolted to a cylinder block via a gasket, according to the first embodiment.

FIG. 2 is an exploded perspective view showing a state immediately before the cylinder head 4 is bolted to the cylinder block 2 via the gasket 6. Here, the gasket 6 is formed with a curved bead portion 6a. The bead portion 6a serves as a part for preventing lubricating oil for lubricating a timing sprocket and a timing chain from leaking to a combustion chamber side and the outside from the internal space 14 (FIGS. 1A and 1B) side of the chain case 8 between the cylinder block 2 and the gasket 6 and between the cylinder head 4 and the gasket 6. The gasket 6 is formed from multiple, here three, metal plates, which are respectively covered entirely with a rubber layer and laminated to form an integrated body. Respective curved parts of the metal plates are integrated to form the bead portion 6a. The curved bead portion 6a is sandwiched between a fastening surface 2a of the cylinder block 2 and a fastening surface 4a of the cylinder head 4 such that the two fastening surfaces 2a, 4a are set in an oil-tight state so as to surround the internal space 14 of the chain case 8.

Figure 3:
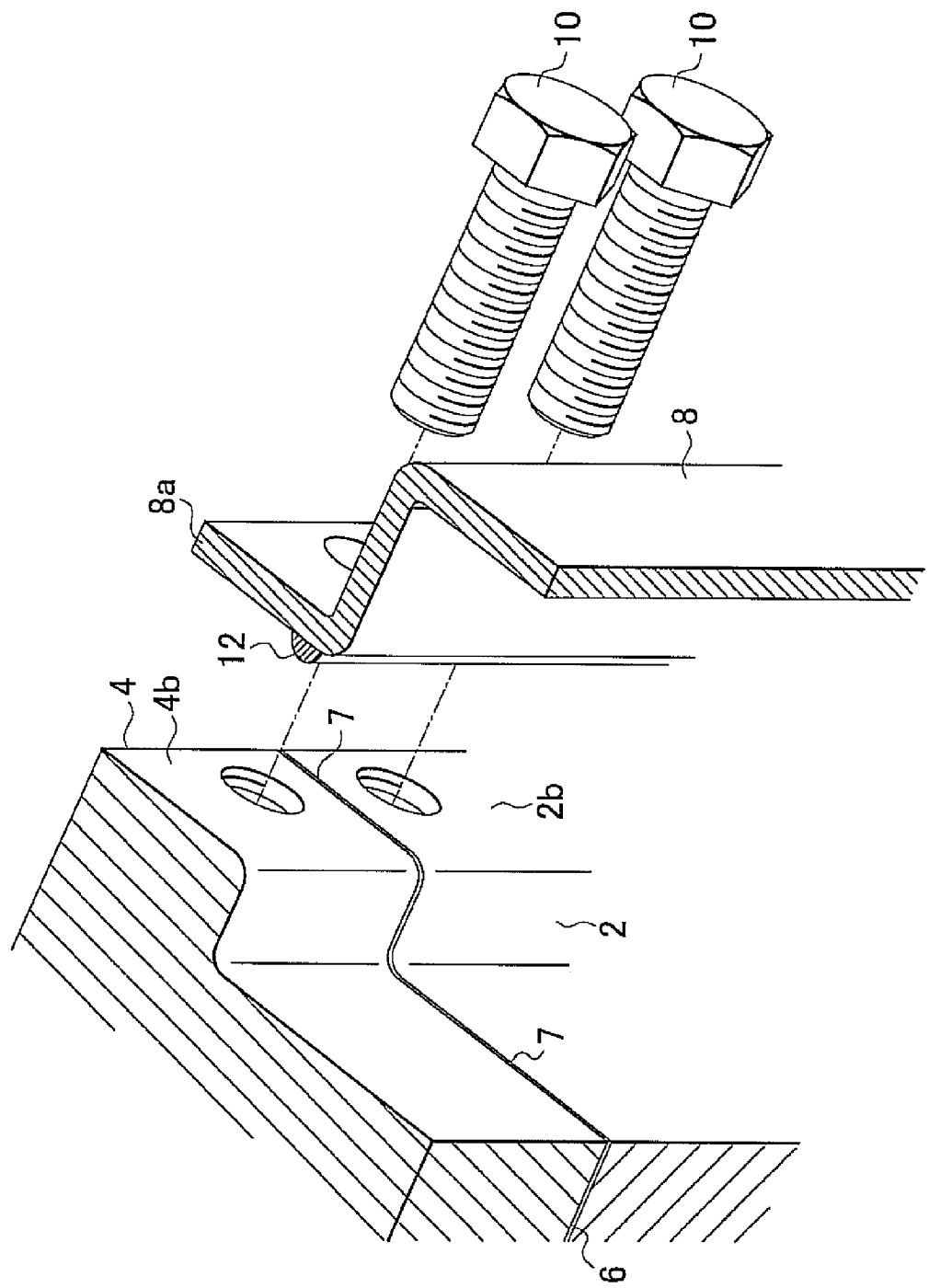
FIG. 3 is a perspective view illustrating bolting of a chain case according to the first embodiment.
Figure 4:
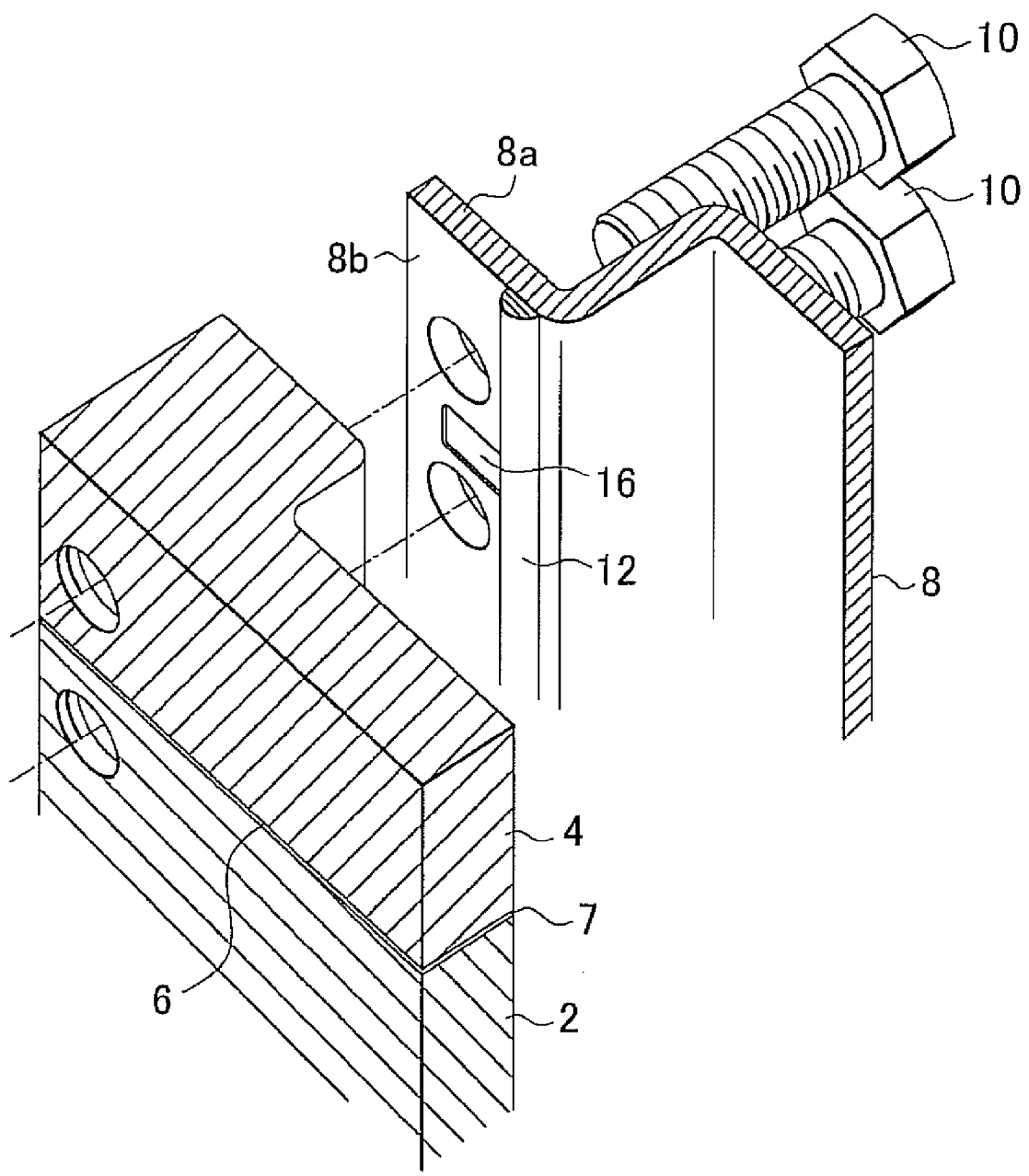
FIG. 4 is a perspective view likewise illustrating bolting of the chain case.
Figure 5:
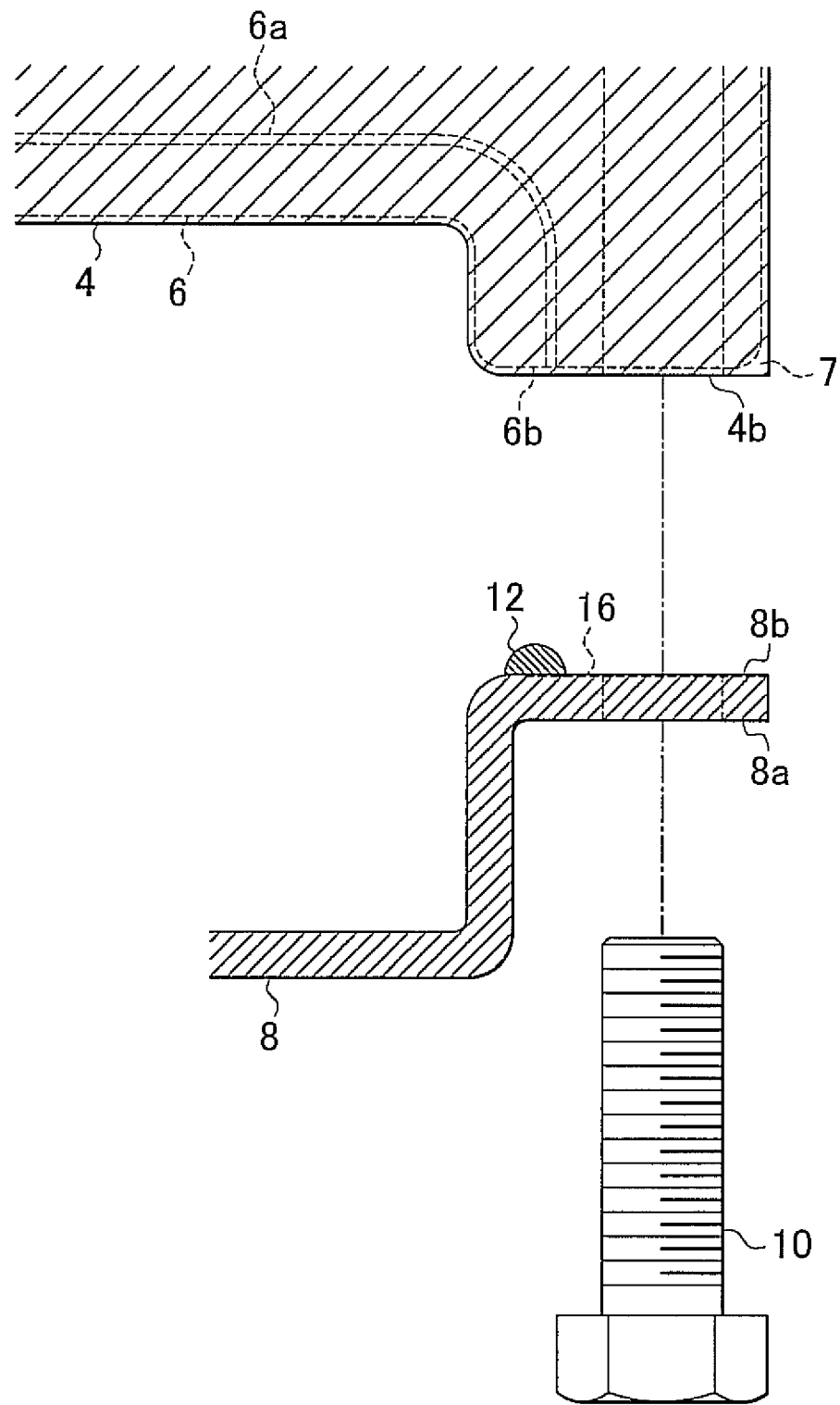
FIG. 5 is a horizontal sectional view likewise illustrating bolting of the chain case.

FIGS. 3 to 5 show a state immediately before the chain case 8 is bolted to the cylinder block 2 and cylinder head 4 sandwiching the gasket 6. To attach the chain case 8, a seal surface 8b opposing planar seal surfaces 2b, 4b serving as the respective end faces of the cylinder block 2 and the cylinder head 4 is formed in planar form on the flange portion 8a of the chain case 8. Immediately before the chain case 8 is bolted, the liquid sealing material 12 is ejected in string form from a liquid sealing material ejection device and applied to the seal surface 8b in a ring shape so as to surround the entire internal space 14 of the chain case 8. Note that the drawings only show a part of the flange portion 8a, which has an overall annular shape, and therefore only a part of the liquid sealing material 12, which is also applied in an overall annular shape, is shown. Also note that the seal surfaces 2b, 4b of the cylinder block 2 and cylinder head 4 are formed on orthogonal surfaces to the surfaces that sandwich the gasket 6, between which the interval 7 is formed.

As shown in FIGS. 6A and 6B, a liquid sealing material guiding recessed portion 16 is formed in the seal surface 8b of the flange portion 8a opposite the interval 7. FIG. 6A is a cut-off perspective view, and FIG. 6B is a principal front view.

As shown in FIGS. 7A to 7C, to be described below, an internal region of the liquid sealing material guiding recessed portion 16 includes a part of the region to which the liquid sealing material 12 is applied. In this embodiment in particular, a part of the region in which the liquid sealing material 12 is applied relative to the interval 7 is included in the internal region of the liquid sealing material guiding recessed portion 16.

Further, as shown in FIGS. 4 and 5, a limit position of the liquid sealing material guiding recessed portion 16 on an inner side of the chain case 8 is a position of the seal surface 8b in which the liquid sealing material 12 is applied, which is located further toward the inner side than the bead portion 6a of the gasket 6. The liquid sealing material guiding recessed portion 16 is formed as a substantially rectangular indentation having a constant depth, which extends from this position toward an outer side of the chain case 8. As shown in FIG. 5, a limit position of the liquid sealing material guiding recessed portion 16 on the outer side of the chain case 8 extends considerably further toward the outer side than the position of the bead portion 6a of the gasket 6. In other words, the liquid sealing material guiding recessed portion 16 is surrounded by the seal surface 8b not only in a thickness direction of the interval 7, indicated by an arrow Y in FIG. 6B, but also in a width direction of the interval 7, indicated by an arrow X, and therefore, the liquid sealing material guiding recessed portion 16 is entirely surrounded by the seal surface 8b. Further, in the width direction of the interval 7, the internal region of the liquid sealing material guiding recessed portion 16 includes the position of the bead portion 6a of the gasket 6 and adjacent regions on either side thereof.

Hence, when the seal surface 8b of the flange portion 8a coated with the liquid sealing material 12 is pressed against the seal surfaces 2b, 4b of the cylinder block 2 and the cylinder head 4 and fastened using the bolts 10 in order to attach the chain case 8 to an internal combustion engine, the unhardened liquid sealing material 12 flows in the following manner.

First, as shown in FIG. 7A, the liquid sealing material 12 on the seal surface 8b of the flange portion 8a is pressed flat by the seal surfaces 2b, 4b on the opposing side. At this time, the liquid sealing material 12 is applied sufficiently further toward the inner side of the chain case 8 (the internal space 14 side) than the positions of bolt insertion holes 8c, 8d to prevent the liquid sealing material 12 from infiltrating the bolt insertion holes 8c, 8d. Accordingly, pressure distribution generated when the bolts 10 are tightened is larger on the outer side of the chain case 8, excluding the part in which the liquid sealing material guiding recessed portion 16 exists. Therefore, the liquid sealing material 12 is pressed flat almost without spreading to the outer side by the pressure that is generated when the bolts 10 are tightened, and thus the liquid sealing material 12 spreads toward the inner side of the chain case 8 as shown by arrows in the drawing.

However, due to an increase in pressure occurring around the liquid sealing material guiding recessed portion 16 when the seal surfaces 2b, 4b, 8b are clamped together, the liquid sealing material 12 existing on the periphery of the liquid sealing material guiding recessed portion 16 is caused to flow into the liquid sealing material guiding recessed portion 16 to add to the liquid sealing material 12 already existing in the liquid sealing material guiding recessed portion 16. Hence, in the liquid sealing material guiding recessed portion 16, the liquid sealing material 12 flows outwardly, as shown by an arrow in the drawing, thereby filling the interior of the liquid sealing material guiding recessed portion 16. As a result, a state shown in FIG. 7B is generated. The liquid sealing material 12 then fills the interior of the liquid sealing material guiding recessed portion 16 further, as shown in FIG. 7C.

When fastening of the chain case 8 has progressed to a certain extent in this manner, the interval between the seal surfaces 2b, 4b, 8b decreases, and therefore the periphery of the liquid sealing material guiding recessed portion 16 approaches a blocked state. Accordingly, the pressure of the liquid sealing material 12 that has spread through the liquid sealing material guiding recessed portion 16 increases. The high-pressure liquid sealing material 12 then flows from the liquid sealing material guiding recessed portion 16 into the interval 7 between the cylinder block 2 and cylinder head 4 in which the gasket 6 is disposed. In FIG. 7C, the liquid sealing material 12 flows into the interval 7 from the liquid sealing material guiding recessed portion 16 in a perpendicular direction to the paper surface.

As described above, the internal region of the liquid sealing material guiding recessed portion 16 is formed over a region including the position of the bead portion 6a of the gasket 6 and the adjacent regions on either side of this position in the inward-outward direction indicated by the arrow X (the width direction of the interval 7). Hence, the liquid sealing material 12 in the liquid sealing material guiding recessed portion 16 flows into the interval 7 between the cylinder block 2 and the cylinder head 4 with a sufficient width on both the inner and outer sides of the bead portion 6a of the gasket 6. Moreover, the pressure of the liquid sealing material 12 in the liquid sealing material guiding recessed portion 16 is high, and therefore the liquid sealing material 12 can flow sufficiently to the innermost portion of the interval 7 even when the interval 7 is narrow. Thus, the liquid sealing material 12 is able to reach and sufficiently adhere to an end portion 6b of the gasket 6 and the periphery thereof.

According to the first embodiment described above, the following effects are obtained. (1) The liquid sealing material guiding recessed portion 16 is provided in the chain case 8, which is disposed opposite the interval 7 between the cylinder block 2 and the cylinder head 4 sandwiching the gasket 6, so as to oppose the interval 7 and be surrounded entirely by the seal surface 8b. Therefore, as described with reference to FIGS. 7A to 7C, when an operation is performed to fasten the chain case 8 to the cylinder block 2 and cylinder head 4 during formation of the seal structure, a large amount of the liquid sealing material 12 is caused to flow forcefully toward the inside of the narrow interval 7 sandwiching the gasket 6. As a result, the liquid sealing material 12 flows to the innermost portion of the interval 7, and therefore the liquid sealing material 12 can reliably reach the end portion 6b of the gasket 6.

Hence, a seal structure with which the liquid sealing material 12 can flow sufficiently to the positions requiring sealing during attachment of the chain case 8 can be provided, and as a result, lubricating oil leakage from the interior of the chain case 8 can be prevented.

(2) In the first embodiment in particular, the gasket 6 includes the bead portion 6a, and therefore the seal may be insufficient if the liquid sealing material 12 only comes into contact with the end portion 6b of the gasket 6. Hence, in the first embodiment, the liquid sealing material guiding recessed portion 16 is formed in the width direction of the interval 7 such that the internal region of the liquid sealing material guiding recessed portion 16 includes the position of the bead portion 6a and the adjacent regions on both sides thereof, and as a result, the liquid sealing material 12 can reliably contact the end portion of the bead portion 6a and both sides thereof. Thus, a complete seal can be obtained.

Second Embodiment

Figure 8B:
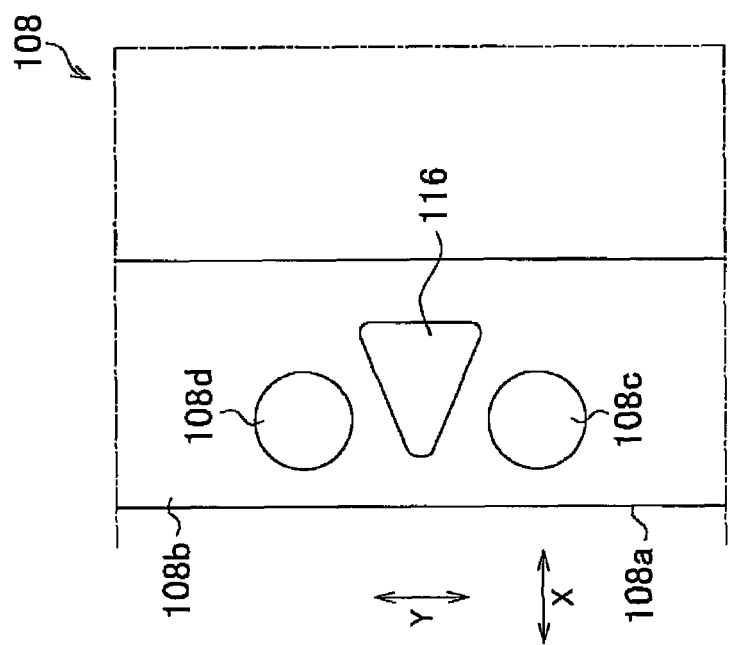
FIGS. 8A and 8B are constitutional diagrams illustrating a seal surface of a chain case according to a second embodiment.
Figure 8A:
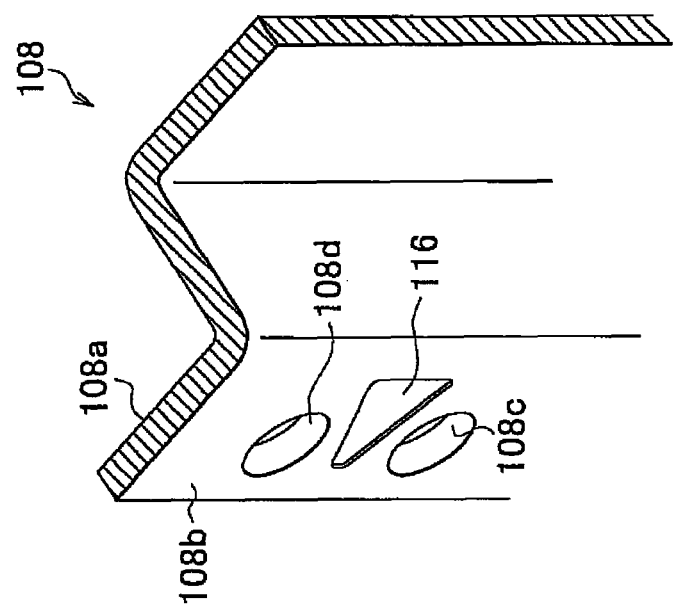

As shown in FIGS. 8A and 8B, a second embodiment of the invention differs from the first embodiment in that a liquid sealing material guiding recessed portion 116 is formed as a substantially triangular recessed portion. All other constitutions are identical to their counterparts in the first embodiment. FIG. 8A is a cut-off perspective view, and FIG. 8B is a principal front view.

Figure 9:
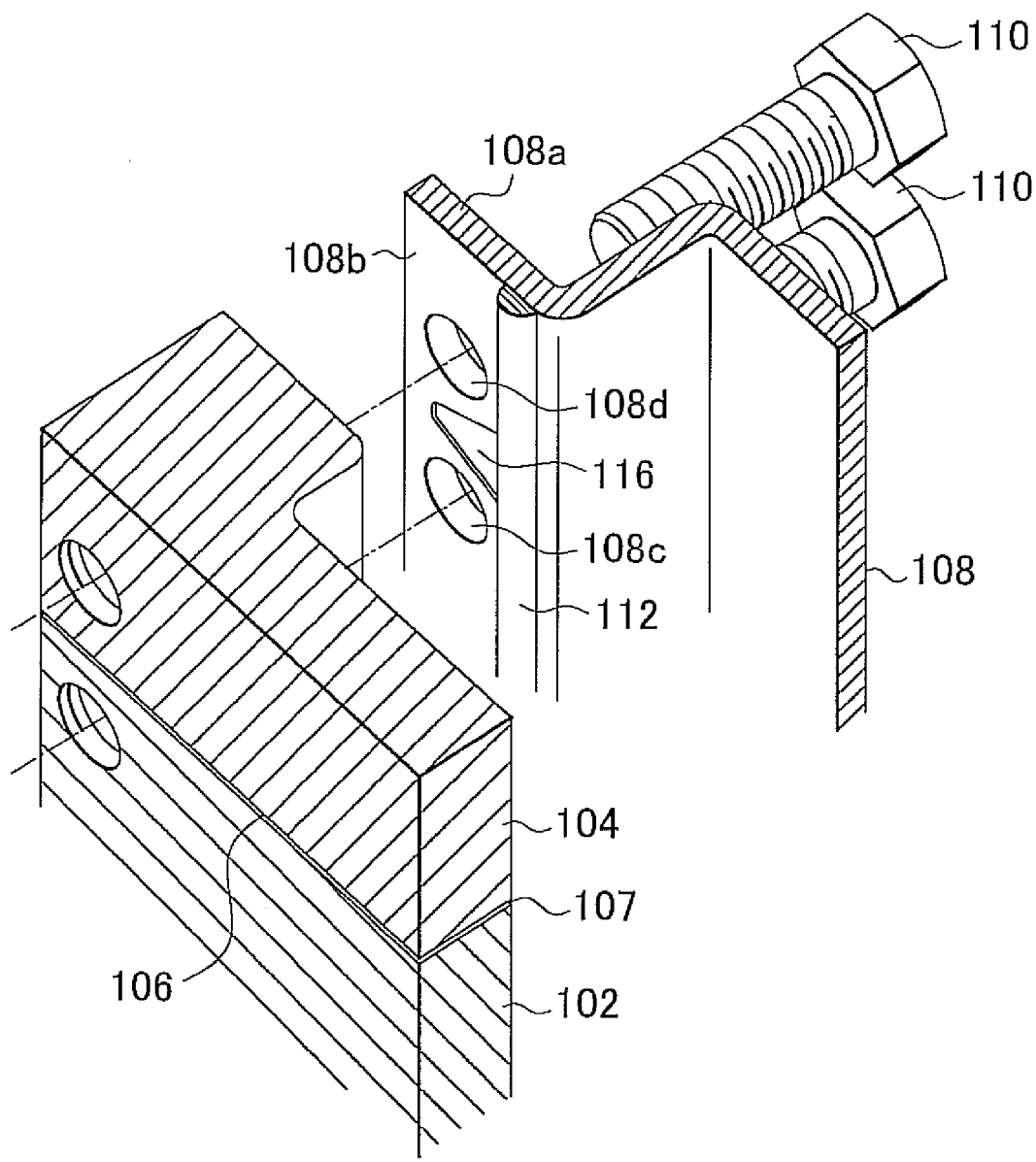
FIG. 9 is a perspective view illustrating bolting of the chain case according to the second embodiment.

As shown in FIG. 9, the liquid sealing material guiding recessed portion 116 is formed such that in a width direction of an interval 107 between a cylinder block 102 and a cylinder head 104 (an X direction in FIG. 8B), the internal region thereof is narrower in a thickness direction of the interval 107 (a Y direction in FIG. 8B) on the side of the bead portion of a gasket 106 than the side (inner side) coated with a liquid sealing material 112.

Hence, when a seal surface 108b of a flange portion 108a is pressed against the seal surfaces of the cylinder block 102 and the cylinder head 104 and fastened by bolts 110 during attachment of a chain case 108 to the internal combustion engine, the unhardened liquid sealing material 112 flows in the following manner.

First, as shown in FIG. 10A, the liquid sealing material 112 on the seal surface 108b of the flange portion 108a is pressed flat by the seal surfaces on the opposing side. As described above in the first embodiment, the pressure distribution generated when the bolts 110 are tightened in bolt insertion holes 108c, 108d is larger on the outer side of the chain case 108, excluding the part in which the liquid sealing material guiding recessed portion 116 exists, and therefore, the liquid sealing material 112 is pressed flat by the pressure generated during tightening of the bolts 110 almost without spreading to the outer side. Thus, the liquid sealing material 112 spreads toward the inner side of the chain case 108, as shown by arrows in the drawing.

However, as in the first embodiment, due to an increase in the clamping pressure of the seal surface 108b occurring around the position of the liquid sealing material guiding recessed portion 116, the liquid sealing material 112 existing on the periphery of the liquid sealing material guiding recessed portion 116 is caused to flow into the liquid sealing material guiding recessed portion 116 to add to the liquid sealing material 112 already existing in the liquid sealing material guiding recessed portion 116. Hence, in the liquid sealing material guiding recessed portion 116, the liquid sealing material 112 flows outwardly, as shown by an arrow in the drawing. In this case, the liquid sealing material guiding recessed portion 116 narrows outwardly in the thickness direction of the interval 107, and therefore the liquid sealing material 112 becomes concentrated in a tip end portion 116a on the left side of the liquid sealing material guiding recessed portion 116, as shown in FIG. 10A. Hence, the liquid sealing material 112 moves to the tip end portion 116a rapidly, as shown in FIG. 10B, whereby the interior of the liquid sealing material guiding recessed portion 116 is filled with the liquid sealing material 112 quickly, as shown in FIG. 10C.

When fastening of the chain case 108 has progressed to a certain extent in this manner, the interval between the seal surfaces of the cylinder block 102 and cylinder head 104 and the seal surface 108b of the chain case 108 decreases, and therefore the periphery of the liquid sealing material guiding recessed portion 116 approaches a blocked state. Accordingly, the pressure of the liquid sealing material 112 spreading through the liquid sealing material guiding recessed portion 116 increases. The high-pressure liquid sealing material 112 then flows from the liquid sealing material guiding recessed portion 116 into the interval 107 in which the gasket 106 is disposed. In FIG. 10C, the liquid sealing material 112 flows into the interval 107 from the liquid sealing material guiding recessed portion 116 in a perpendicular direction to the paper surface. The liquid sealing material 112 is particularly concentrated in the tip end portion 116a, and therefore flows into the interval 107 efficiently.

The internal region of the liquid sealing material guiding recessed portion 116 is formed over a region including the position of the bead portion of the gasket 106 and the adjacent regions on either side of this position in the inward-outward direction (the width direction of the interval 107) indicated by the arrow X (FIG. 8B). Hence, as described above in the first embodiment, the liquid sealing material 112 flows into the interval 107 between the cylinder block 102 and cylinder head 104 with a sufficient width on both the inner and outer sides of the bead portion of the gasket 106. Moreover, the pressure of the liquid sealing material 112 in the liquid sealing material guiding recessed portion 116 is high, and as described above, the liquid sealing material 112 is concentrated in the tip end portion 116a, and therefore the liquid sealing material 112 can flow sufficiently to the innermost portion of the interval 107 even when the interval 107 is narrow. Thus, the liquid sealing material 112 is able to reach and sufficiently adhere to the end portion of the gasket 106.

According to the second embodiment described above, the following effects are obtained. (1) In addition to the effects of the first embodiment, the following effect is achieved by setting the size of the internal region of the liquid sealing material guiding recessed portion 116 in the thickness direction of the interval 107 in the manner described above. When the chain case 108 approaches the cylinder block 102 and the cylinder head 104 during formation of the seal structure, the liquid sealing material 112 flows into the liquid sealing material guiding recessed portion 116 from the periphery of the liquid sealing material guiding recessed portion 116 on the large side of the internal region of the liquid sealing material guiding recessed portion 116 in the thickness direction of the interval 107. When the distance between the chain case 108 and the cylinder block 102 and cylinder head 104 is reduced further, the liquid sealing material 112 in the liquid sealing material guiding recessed portion 116 moves to become concentrated on the narrow bead portion side of the liquid sealing material guiding recessed portion 116 in the thickness direction of the interval 107. The liquid sealing material 112 then passes over the position of the bead portion and becomes concentrated on the tip end portion 116a side. Thus, the liquid sealing material 112 travels sufficiently over the position of the bead portion and the adjacent regions on both sides thereof. From this state, the periphery of the liquid sealing material guiding recessed portion 116 eventually arrives at a state of surface contact, and as a result, the liquid sealing material 112 that has flowed into the liquid sealing material guiding recessed portion 116 runs out of places to escape to and increases in pressure. Hence, a large amount of the liquid sealing material 112 is caused to flow forcefully into the interval 107 sandwiching the gasket 106, and as a result, the liquid sealing material 112 flows to the innermost portion of the interval 107. Thus, the liquid sealing material 112 reliably reaches the end portion of the gasket 106, and particularly the periphery of the bead portion.

Hence, a seal structure with which the liquid sealing material 112 can flow sufficiently to the positions requiring sealing, i.e. the periphery of the bead portion for securing the seal, during attachment of the chain case 108 can be provided, and as a result, lubricating oil leakage from the interior of the chain case 108 can be reliably prevented.

Third Embodiment

Figure 11A:
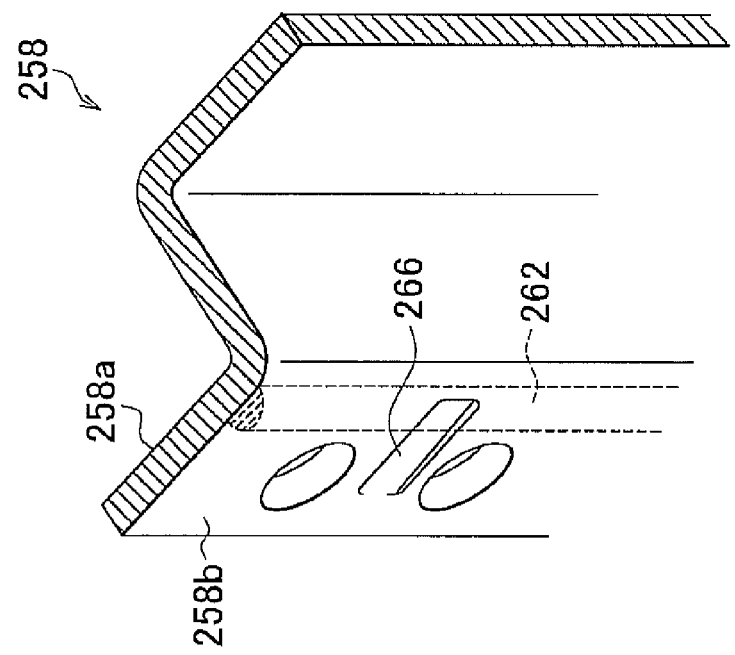
FIGS. 11A and 11B are constitutional diagrams illustrating a seal surface of a chain case according to a third embodiment.
Figure 11B:
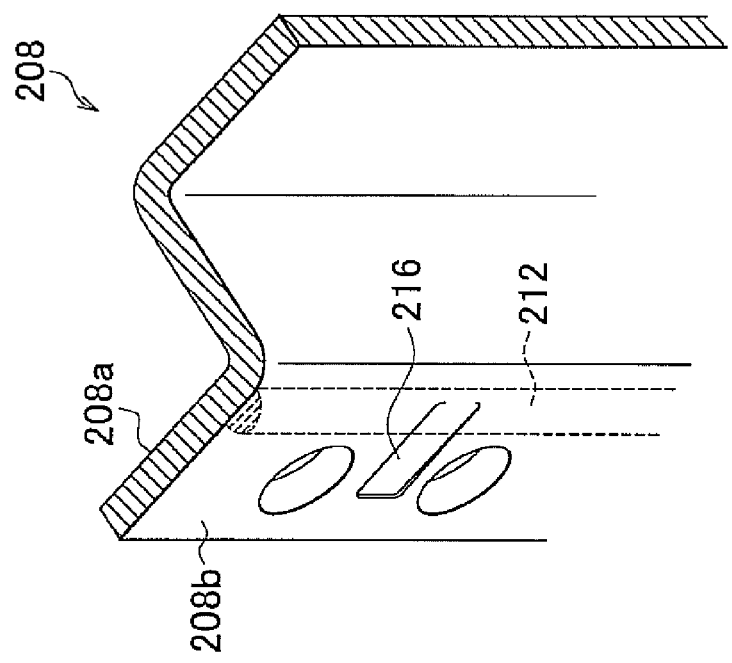

As shown in FIGS. 11A and 11B, in a third embodiment of the invention, a liquid sealing material guiding recessed portion 216, 266 varies in depth toward the outer side of a chain case 208, 258. FIG. 11A shows a case in which the depth of the liquid sealing material guiding recessed portion 216 is increased toward the outer side such that an application position of a liquid sealing material 212 corresponds to a shallow side and the liquid sealing material guiding recessed portion 216 deepens from this application position toward the bead portion of the gasket. FIG. 11B shows a case in which the depth of the liquid sealing material guiding recessed portion 266 is reduced toward the outer side such that the application position of a liquid sealing material 262 corresponds to a deep side and the liquid sealing material guiding recessed portion 266 becomes shallower from the application position toward the bead portion of the gasket. All other constitutions are identical to their counterparts in the first embodiment.

According to the third embodiment described above, the following effect is obtained. (1) In addition to the effects of the first embodiment, in the case shown in FIG. 11A, the liquid sealing material 212 flows through the liquid sealing material guiding recessed portion 216 toward the outer side of the chain case 208 more quickly than in the first embodiment during attachment of the chain case 208. Therefore, the liquid sealing material 212 can be disposed quickly and sufficiently in the position of the bead portion of the gasket and the adjacent regions thereto and ultimately adhered to the end portion of the gasket over a wide range. As a result, an even more complete seal can be obtained.

In the case shown in FIG. 11B, the liquid sealing material 262 flows through the liquid sealing material guiding recessed portion 266 toward the outer side of the chain case 258 during attachment of the chain case 258 such that the liquid sealing material 262 can be disposed sufficiently in the position of the bead portion of the gasket and the adjacent regions thereto while rapidly increasing in pressure. Hence, a large amount of the liquid sealing material 262 is caused to flow forcefully into the interval sandwiching the gasket, and as a result, an even more complete seal can be obtained.

Fourth Embodiment

Figure 12:
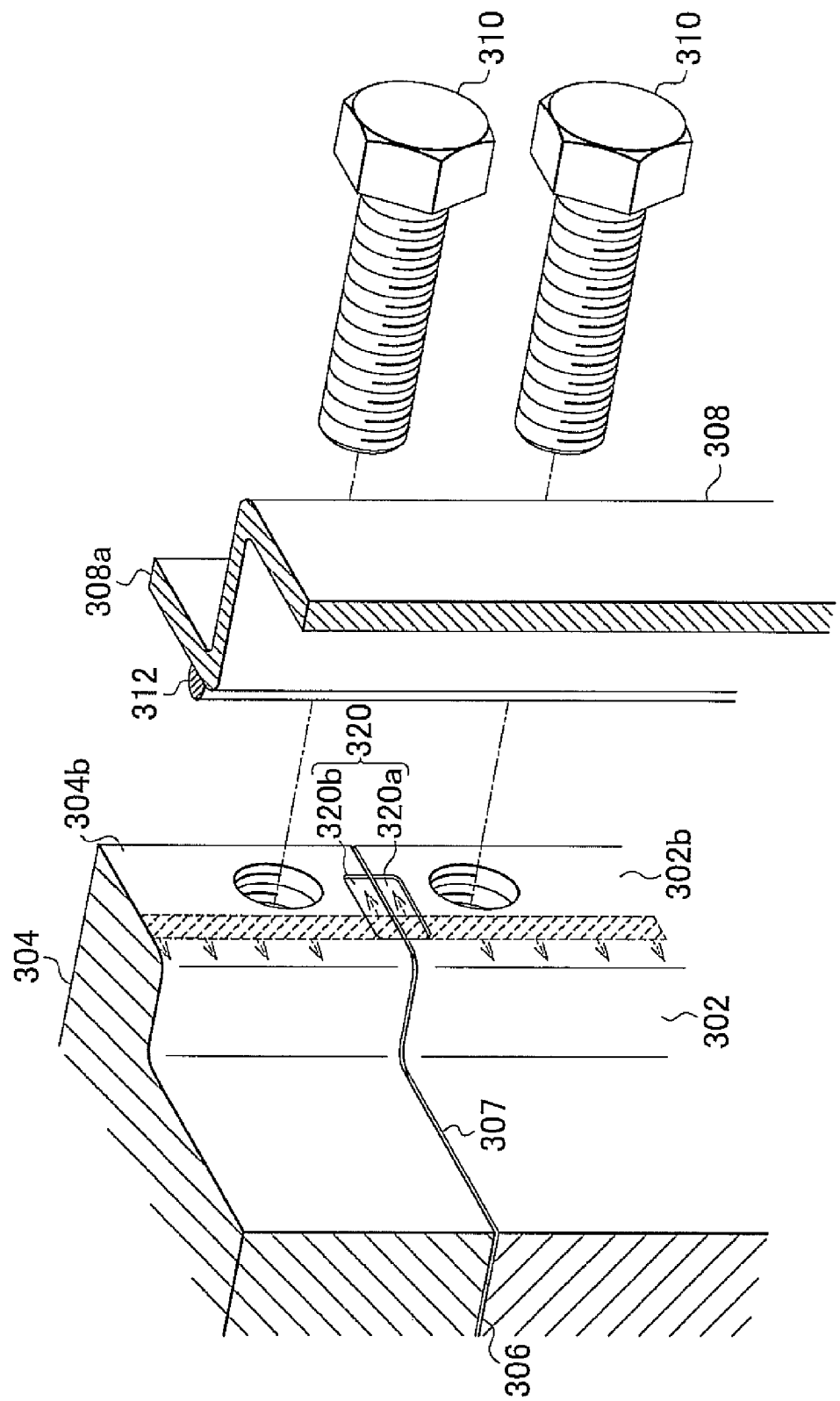
FIG. 12 is a perspective view illustrating bolting of a chain case according to a fourth embodiment.

As shown in FIG. 12, in a fourth embodiment of the invention, a liquid sealing material guiding recessed portion 320 is not provided on a flange portion 308a side of a chain case 308, but formed over both a seal surface 302b of a cylinder block 302 and a seal surface 304b of a cylinder head 304. Here, a half-sized liquid sealing material guiding recessed portion 320a is formed on the seal surface 302b of the cylinder block 302, and another half-sized liquid sealing material guiding recessed portion 320b is formed on the seal surface 304b of the cylinder head 304. In other words, the liquid sealing material guiding recessed portions 320a, 320b are both formed such that the respective peripheries thereof are entirely surrounded by an interval 307 between the cylinder block 302 and the cylinder head 304 and the seal surfaces 302b, 304b. All other constitutions are identical to their counterparts in the first embodiment.

A liquid sealing material 312 is ejected onto the flange portion 308a side of the chain case 308. Hence, when the chain case 308 is fastened to the cylinder block 302 and the cylinder head 304 by bolts 310, the liquid sealing material 312 flows in the following manner.

First, as shown in the drawing, the liquid sealing material 312 ejected onto the flange portion 308a of the chain case 308 is pressed flat against the seal surfaces 302b, 304b of the cylinder block 302 and cylinder head 304 in a position indicated by broken lines. Then, as the flange portion 308a of the chain case 308 approaches the cylinder block 302 and cylinder head 304 side, most of the liquid sealing material 312, having received pressure, moves toward the inner side of the chain case 308. However, the liquid sealing material 312 on the periphery of the liquid sealing material guiding recessed portion 320 flows into the liquid sealing material guiding recessed portion 320. The liquid sealing material 312 then flows toward the outer side of the chain case 308 so as to fill the liquid sealing material guiding recessed portion 320 together with the liquid sealing material 312 that has already entered the liquid sealing material guiding recessed portion 320. Eventually, the liquid sealing material 312 filling the liquid sealing material guiding recessed portion 320 runs out of places to escape to, and therefore flows into the interval 307 sandwiching a gasket 306 with a wide and forceful flow.

According to the fourth embodiment described above, the following effect is obtained. (1) The effects of the first embodiment can be obtained even when the liquid sealing material guiding recessed portion 320 is provided in the cylinder block 302 and the cylinder head 304 rather than the chain case 308 side.

Other Embodiments (a) In the fourth embodiment, as shown in FIG. 12, the liquid sealing material guiding recessed portion 320 (320a, 320b) is formed over both the seal surface 302b of the cylinder block 302 and the seal surface 304b of the cylinder head 304. However, the liquid sealing material guiding recessed portion 320 need not be provided on both of the seal surfaces 302b, 304b, and instead, the liquid sealing material guiding recessed portion 320a may be provided on the seal surface 302b of the cylinder block 302 alone, or the liquid sealing material guiding recessed portion 320b may be provided on the seal surface 304b of the cylinder head 304 alone.

Alternatively, when the liquid sealing material guiding recessed portion is provided on one or both of the seal surfaces of the cylinder block and the cylinder head, similar effects can be obtained by employing a liquid sealing material guiding recessed portion shaped as described above in the second embodiment or the third embodiment.

Further, the liquid sealing material guiding recessed portion may be formed on one or both of the seal surfaces of the cylinder block and cylinder head and also on the seal surface of the chain case. Alternatively, application of the liquid sealing material 312 may be performed by ejecting the liquid sealing material 312 onto the cylinder block 302 and cylinder head 304 side.

(b) In the first to third embodiments, application of the liquid sealing material may be performed by ejecting the liquid sealing material onto the cylinder block and cylinder head side. (c) The depth of the substantially triangular liquid sealing material guiding recessed portion described in the second embodiment may be varied as described in the third embodiment.

(d) In each of the above embodiments, the seal surface of the chain case, which serves as a third member, is attached to the respective seal surfaces of the cylinder block, which serves as a first member, and the cylinder head, which serves as a second member, wherein orthogonal end faces to the surfaces sandwiching the gasket serve as the seal surfaces of the cylinder block and the cylinder head. However, a seal structure shown in FIGS. 13A and 13B may be used instead.

Figure 13A:
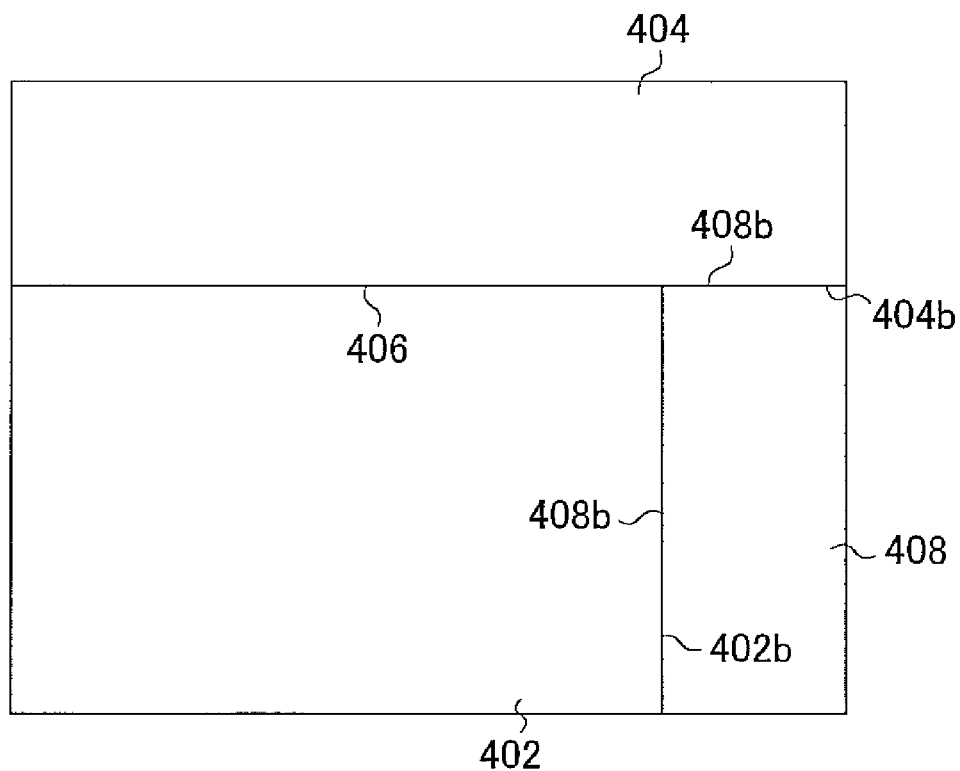
FIGS. 13A and 13B are illustrative views showing a seal structure according to another embodiment.

In FIG. 13A, a gasket 406 is disposed between a cylinder block 402 and a cylinder head 404, and the cylinder head 404 covers the chain case 408 from above.

Figure 13B:
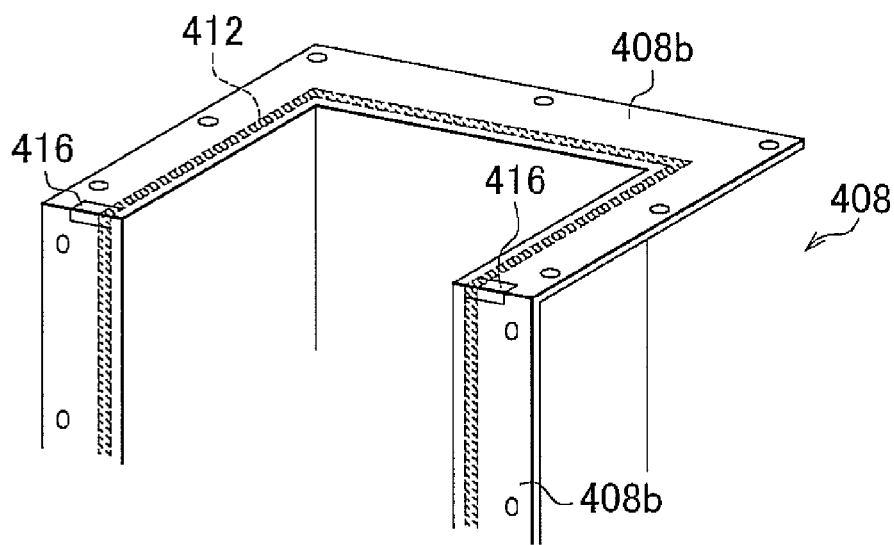

Hence, with respect to the cylinder block 402, an orthogonal surface to the surfaces sandwiching the gasket 406 serves as a seal surface 402b, but with respect to the cylinder head 404, an identical surface to the surface sandwiching the gasket 406, rather than an orthogonal surface to the surface sandwiching the gasket 406, serves as a seal surface 404b. Accordingly, with respect to a chain case 408, a seal surface 408b is bent back into an orthogonal state in a position opposing the interval in which the gasket 406 is sandwiched, as shown in FIG. 13B.

Therefore, a liquid sealing material guiding recessed portion 416 is formed in the position in which the seal surface 408b is bent back into the orthogonal state, and a liquid sealing material 412 is applied as shown by broken lines. Note that the liquid sealing material guiding recessed portion 416 may take any of the forms described in the first to third embodiments.

Alternatively, the liquid sealing material guiding recessed portion may be formed on one or both of the seal surfaces 402b, 404b of the cylinder block 402 and the cylinder head 404, as described above in the fourth embodiment.

Similar effects to those of the first to fourth embodiments also can be obtained with this seal structure.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less, or only a single element, are also within the scope of the invention.

What is claimed is:

1. A seal structure comprising;
    a part which includes an interval between a first member and a second member sandwiching a gasket, and in which a third member is disposed to face the first member and the second member via a liquid sealing material,
    a seal surface provided on the third member, the seal surface having a liquid sealing material guiding recessed portion that opposes the interval and is entirely surrounded by the seal surface, and
    an internal region of the liquid sealing material guiding recessed portion includes a part of a region to which the liquid sealing material is applied, wherein the gasket includes a bead portion, one end of which exists on a seal surface side, and the internal region of the liquid sealing material guiding recessed portion includes a position of the bead portion and adjacent regions on both sides of the position of the bead portion in a width direction of the interval, wherein the liquid sealing material guiding recessed portion is formed such that in the width direction of the interval, the internal region of the liquid sealing material guiding recessed portion is narrower in a thickness direction of the interval on a bead portion side than a side coated with the liquid sealing material.

2. The seal structure according to claim 1, wherein the internal region of the liquid sealing material guiding recessed portion includes a part or all of a region in which the liquid sealing material is applied to the interval.

3. The seal structure according to claim 1, wherein the first member is a cylinder head of an internal combustion engine, the second member is a cylinder block of the internal combustion engine, and the third member is a chain case of the internal combustion engine.

4. The seal structure according to claim 1, wherein the seal surface of the third member is attached to respective seal surfaces of the first member and the second member, and end faces of the first member and the second member that are orthogonal to surfaces thereof sandwiching the gasket serve as the seal surfaces.

5. A seal structure comprising:
a part which includes an interval between a first member and a second member sandwiching a gasket, and in which a third member is disposed to face the first member and the second member via a liquid sealing material,
a seal surface provided on the third member, the seal surface having a liquid sealing material guiding recessed portion that opposes the interval and is entirely surrounded by the seal surface, and
an internal region of the liquid sealing material guiding recessed portion includes a part of a region to which the liquid sealing material is applied,
wherein the gasket includes a bead portion, one end of which exists on a seal surface side, and
the internal region of the liquid sealing material guiding recessed portion includes a position of the bead portion and adjacent regions on both sides of the position of the bead portion in a width direction of the interval,
wherein the liquid sealing material guiding recessed portion is formed to be deeper on a bead portion side than the side coated with the liquid sealing material in the width direction of the interval.

6. The seal structure according to claim 5, wherein the first member is a cylinder head of an internal combustion engine, the second member is a cylinder block of the internal combustion engine, and the third member is a chain case of the internal combustion engine.

7. A seal structure comprising:
a part which includes an interval between a first member and a second member sandwiching a gasket, and in which a third member is disposed to face the first member and the second member via a liquid sealing material,
a seal surface provided on the third member, the seal surface having a liquid sealing material guiding recessed portion that opposes the interval and is entirely surrounded by the seal surface, and
an internal region of the liquid sealing material guiding recessed portion includes a part of a region to which the liquid sealing material is applied,
wherein the gasket includes a bead portion, one end of which exists on a seal surface side, and
the internal region of the liquid sealing material guiding recessed portion includes a position of the bead portion and adjacent regions on both sides of the position of the bead portion in a width direction of the interval,
wherein the liquid sealing material guiding recessed portion is formed to be shallower on a bead portion side than the side coated with the liquid sealing material in the width direction of the interval.

8. The seal structure according to claim 7, wherein the first member is a cylinder head of an internal combustion engine, the second member is a cylinder block of the internal combustion engine, and the third member is a chain case of the internal combustion engine.

9. A seal structure comprising:
a part which includes an interval between a first member and a second member sandwiching a gasket, and in which a third member is disposed to face the first member and the second member via a liquid sealing material,
a seal surface provided on one or both of the first member and the second member, the seal surface having a liquid sealing material guiding recessed portion that is entirely surrounded by the interval and the seal surface, and
an internal region of the liquid sealing material guiding recessed portion includes a part of a region to which the liquid sealing material is applied,
wherein the gasket includes a bead portion, one end of which exists on the seal surface side, and
the internal region of the liquid sealing material guiding recessed portion includes a position of the bead portion and adjacent regions on both sides of the position of the bead portion in a width direction of the interval,
wherein the liquid sealing material guiding recessed portion is formed such that in the width direction of the interval, the internal region of the liquid sealing material guiding recessed portion is narrower in a thickness direction of the interval on the bead portion side than a side coated with the liquid sealing material.

10. The seal structure according to claim 9, wherein the first member is a cylinder head of an internal combustion engine, the second member is a cylinder block of the internal combustion engine, and the third member is a chain case of the internal combustion engine.

11. The seal structure according to claim 9, wherein the seal surface of the third member is attached to respective seal surfaces of the first member and the second member, and end faces of the first member and the second member that are orthogonal to surfaces thereof sandwiching the gasket serve as the seal surfaces.

12. A seal structure comprising:
a part which includes an interval between a first member and a second member sandwiching a gasket, and in which a third member is disposed to face the first member and the second member via a liquid sealing material,
a seal surface provided on one or both of the first member and the second member, the seal surface having a liquid sealing material guiding recessed portion that is entirely surrounded by the interval and the seal surface, and
an internal region of the liquid sealing material guiding recessed portion includes a part of a region to which the liquid sealing material is applied,
wherein the gasket includes a bead portion, one end of which exists on the seal surface side, and
the internal region of the liquid sealing material guiding recessed portion includes a position of the bead portion and adjacent regions on both sides of the position of the bead portion in a width direction of the interval, wherein the liquid sealing material guiding recessed portion is formed to be deeper on the bead portion side than the side coated with the liquid sealing material in the width direction of the interval.

13. The seal structure according to claim 12, wherein the first member is a cylinder head of an internal combustion engine, the second member is a cylinder block of the internal combustion engine, and the third member is a chain case of the internal combustion engine.

14. A seal structure comprising:

a part which includes an interval between a first member and a second member sandwiching a gasket, and in which a third member is disposed to face the first member and the second member via a liquid sealing material, a seal surface provided on one or both of the first member and the second member, the seal surface having a liquid sealing material guiding recessed portion that is entirely surrounded by the interval and the seal surface, and an internal region of the liquid sealing material guiding recessed portion includes a part of a region to which the liquid sealing material is applied, wherein the gasket includes a bead portion, one end of which exists on the seal surface side, and the internal region of the liquid sealing material guiding recessed portion includes a position of the bead portion and adjacent regions on both sides of the position of the bead portion in a width direction of the interval, wherein the liquid sealing material guiding recessed portion is formed to be shallower on the bead portion side than the side coated with the liquid sealing material in the width direction of the interval.

15. The seal structure according to claim 14, wherein the first member is a cylinder head of an internal combustion engine, the second member is a cylinder block of the internal combustion engine, and the third member is a chain case of the internal combustion engine.

* * * * *